US009898360B1

(12) United States Patent
Schrock et al.

(10) Patent No.: US 9,898,360 B1
(45) Date of Patent: *Feb. 20, 2018

(54) PREVENTING UNNECESSARY DATA RECOVERY

(71) Applicant: Google Inc., Mountain View, CA (US)

(72) Inventors: Christian Eric Schrock, Cold Spring Harbor, NY (US); Robert Cypher, Saratoga, CA (US); Steven Robert Schirripa, Hazlet, NJ (US)

(73) Assignee: Google LLC, Mountain View, CA (US)

( * ) Notice: Subject to any disclaimer, the term of this patent is extended or adjusted under 35 U.S.C. 154(b) by 148 days.

This patent is subject to a terminal disclaimer.

(21) Appl. No.: 14/980,633

(22) Filed: Dec. 28, 2015

Related U.S. Application Data

(63) Continuation of application No. 14/188,965, filed on Feb. 25, 2014, now Pat. No. 9,223,644.

(51) Int. Cl.
*G06F 11/07* (2006.01)

(52) U.S. Cl.
CPC ...... *G06F 11/0793* (2013.01); *G06F 11/0757* (2013.01); *G06F 11/0709* (2013.01); *G06F 11/079* (2013.01)

(58) Field of Classification Search
CPC ............... G06F 11/0709; G06F 11/079; G06F 11/0793; G06F 11/1088
See application file for complete search history.

(56) References Cited

U.S. PATENT DOCUMENTS

| 7,930,611 | B2 | 4/2011 | Huang et al. | |
|---|---|---|---|---|
| 8,285,686 | B2 | 10/2012 | Kesselman | |
| 8,341,457 | B2 | 12/2012 | Spry et al. | |
| 8,615,698 | B1 | 12/2013 | Cypher | |
| 9,323,615 | B2* | 4/2016 | Cypher | G06F 11/2094 |
| 2002/0152425 | A1* | 10/2002 | Chaiken | G06F 11/0793 714/23 |
| 2006/0085674 | A1* | 4/2006 | Ananthamurthy | G11B 20/10 714/6.12 |
| 2012/0281523 | A1* | 11/2012 | Huber | H04L 41/0663 370/217 |

OTHER PUBLICATIONS

CC. Huang M. Chen, and J. Li, "*Pyramid Codes: Schemes to Trade Space for Access Efficiency in Reliable Data Storage Systems,*"Proc. of IEEE NCA, Cambridge, MA, Jul. 2007.
*Erasure Coding in Windows Azure Storag.*

\* cited by examiner

*Primary Examiner* — Joseph Kudirka

(57) ABSTRACT

A method that prevents unnecessary data recovery includes receiving, at a data processing device, a status of a resource of a distributed system. When the status of the resource indicates a resource failure, the method includes executing instructions on the data processing device to determine whether the resource failure is correlated to any other resource failures within the distributed system. When the resource failure is correlated to other resource failures within the distributed system, the method includes delaying execution on the data processing device of a remedial action associated with the resource. However, when the resource failure is uncorrelated to other resource failures within the distributed system, the method includes initiating execution on the data processing device of the remedial action associated with the resource.

21 Claims, 12 Drawing Sheets

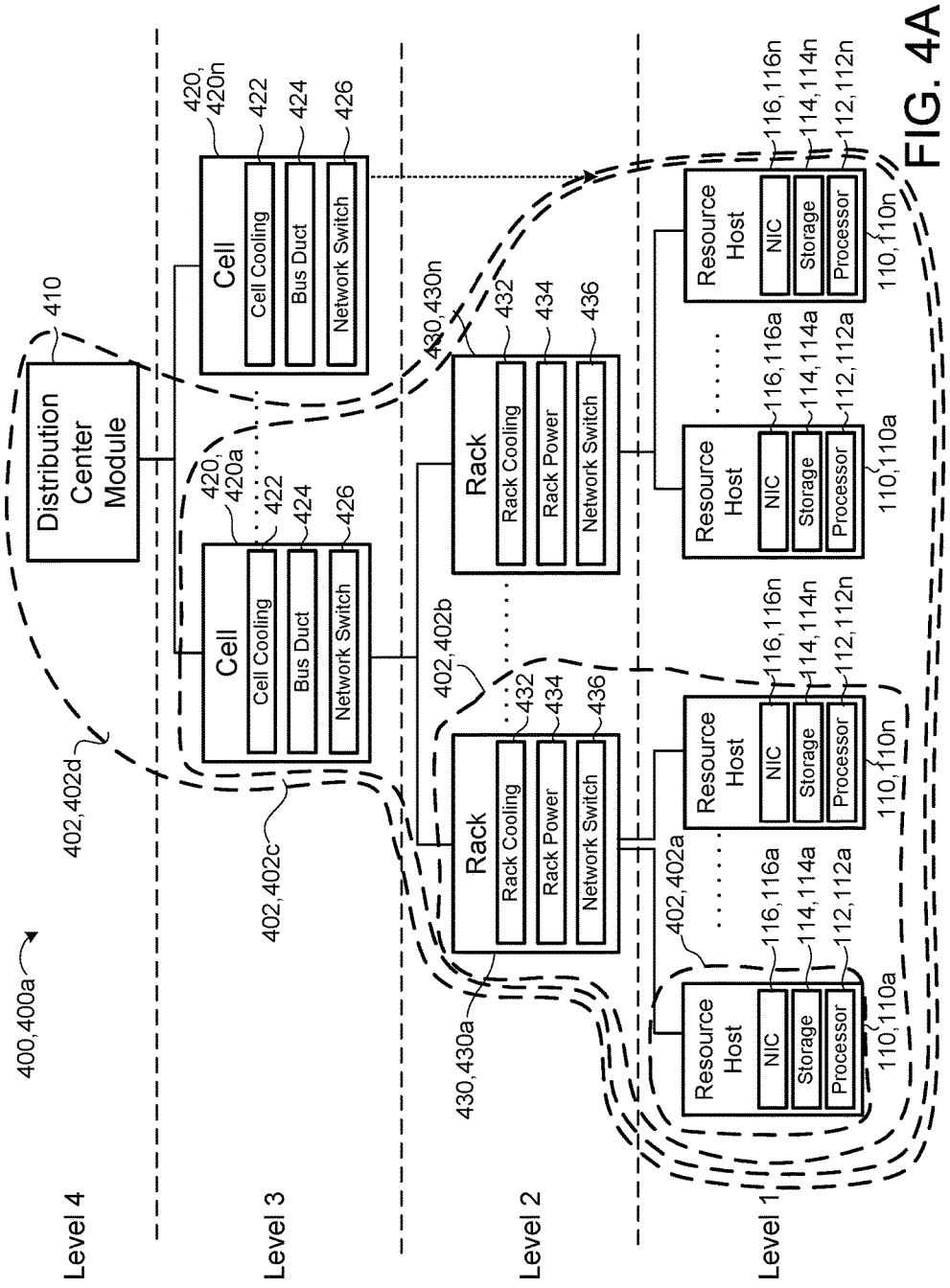

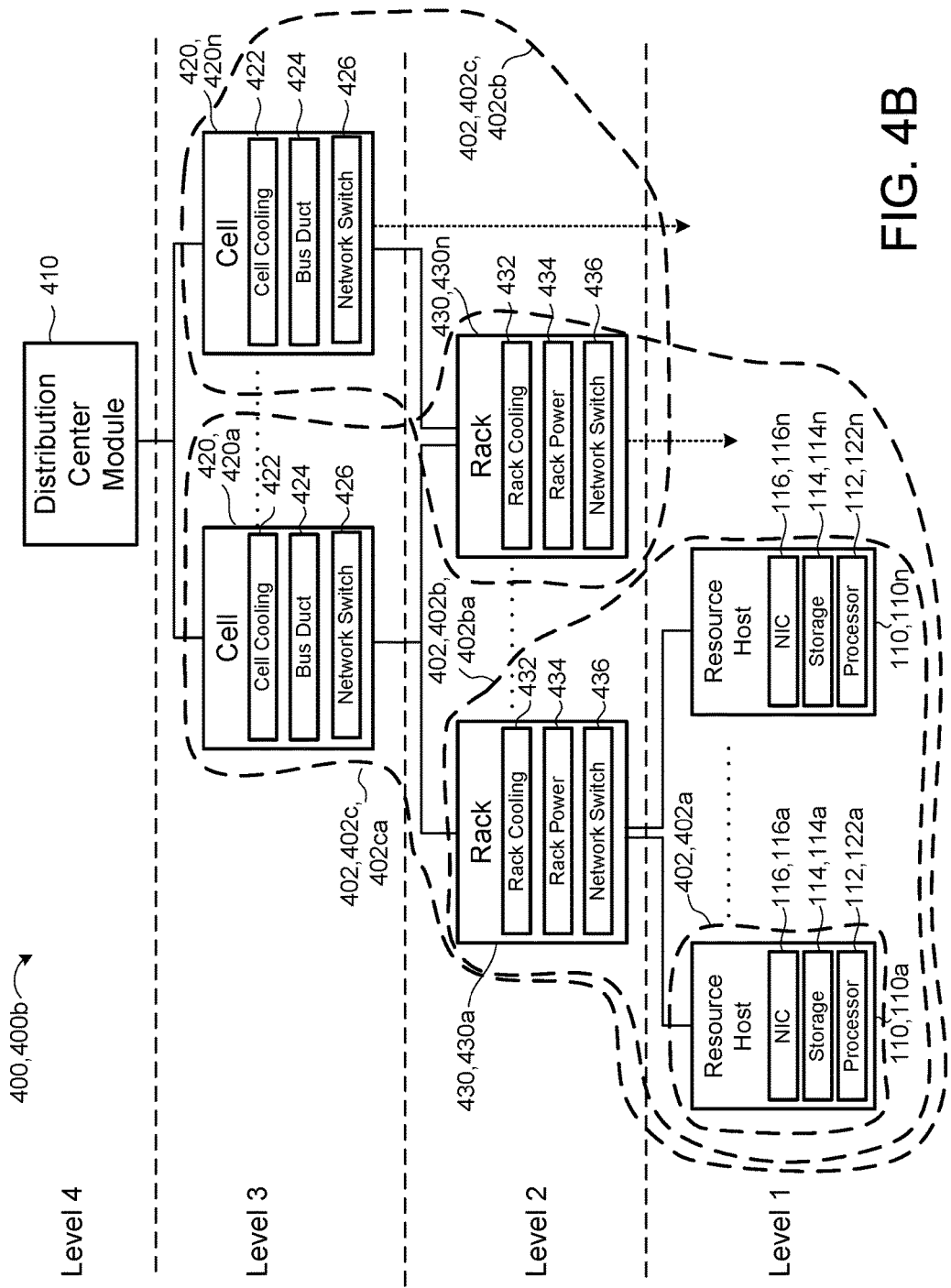

PREVENTING UNNECESSARY DATA RECOVERY

CROSS REFERENCE TO RELATED APPLICATIONS

This U.S. patent application is a continuation of, and claims priority under 35 U.S.C. § 120 from, U.S. patent application Ser. No. 14/188,965, filed on Feb. 25, 2014 (now U.S. Pat. No. 9,223,644), which is hereby incorporated by reference in its entirety.

TECHNICAL FIELD

This disclosure relates to preventing unnecessary data recovery copies in a distributed system.

BACKGROUND

A distributed system generally includes many loosely coupled computers, each of which typically includes a computing resource (e.g., one or more processors) and/or storage resources (e.g., memory, flash memory, and/or disks). A distributed storage system overlays a storage abstraction (e.g., key/value store or file system) on the storage resources of a distributed system. In the distributed storage system, a server process running on one computer can export that computer's storage resources to client processes running on other computers. Remote procedure calls (RPC) may transfer data from server processes to client processes. Alternatively, Remote Direct Memory Access (RDMA) primitives may be used to transfer data from server hardware to client processes.

SUMMARY

One aspect of the disclosure provides a method that includes receiving, at a data processing device, a status of a resource of a distributed system. When the status of the resource indicates a resource failure, the method includes executing instructions on the data processing device to determine whether the resource failure is correlated to any other resource failures within the distributed system. When the resource failure is correlated to other resource failures within the distributed system, the method includes delaying execution on the data processing device of a remedial action associated with the resource. However, when the resource failure is uncorrelated to other resource failures within the distributed system, the method includes initiating execution on the data processing device of the remedial action associated with the resource.

Implementations of the disclosure may include one or more of the following features. In some implementations, when the resource failure is correlated to other resource failures within the distributed system, the method includes executing the remedial action on the data processing device after a first threshold period of time. In addition when the resource failure is uncorrelated to other resource failures within the distributed system, the method includes executing the remedial action on the data processing device after a second threshold period of time. The first threshold period of time is greater than the second threshold period of time. The second threshold period of time may be between about 15 minutes and about 30 minutes. Other threshold periods are possible as well.

The resource may include non-transitory memory or computer processors. When the resource includes non-transitory memory, the method may include initiating data reconstruction as the remedial action for any data stored on the non-transitory memory. The data may include chunks of a file, where the file is divided into stripes having data chunks and non-data chunks. Moreover, when the resource includes a computer processor, the method includes migrating or restarting a job previously executing on a failed computer processor to an operational computer processor.

In some implementations, the method includes determining whether the resource failure is correlated to any other resource failures within the distributed system based on a system hierarchy of the distributed system. The system hierarchy includes system domains, where each system domain has an active state or an inactive state. The resource (e.g., non-transitory memory or computer processor) belongs to at least one system domain. The method may further include determining the resource failure as correlated to other resource failures, when a statistically significant number of the resources having failures reside in the same system domain, or when the resource resides in an inactive system domain.

Another aspect of the disclosure provides a recovery system for a distributed system. The recovery system includes a data processing device in communication with resources of the distributed system. The data processing device receives a status of a resource of the distributed system. When the status of the resource indicates a resource failure, the data processing device executes instructions to determine whether the resource failure is correlated to any other resource failures within the distributed system. When the resource failure is correlated to other resource failures within the distributed system, the data processing device delays execution of a remedial action associated with the resource. However, when the resource failure is uncorrelated to other resource failures within the distributed system, the data processing device initiates execution of the remedial action associated with the resource.

In some implementations, when the resource failure is correlated to other resource failures within the distributed system, the data processing device delays execution of the remedial action associated with the resource for a first threshold period of time. In addition, when the resource failure is uncorrelated to other resource failures within the distributed system, the data processing device initiates execution of the remedial action associated with the resource after a second threshold period of time. The first threshold period of time is greater than the second threshold period of time. The second threshold period of time may be between about 15 minutes and about 30 minutes.

The resources may include non-transitory memory or a computer processor. When the resource includes non-transitory memory, the data processing device initiates data reconstruction as the remedial action for any data stored on the non-transitory memory. The data includes chunks of a file, where the file is divided into stripes having data chunks and non-data chunks. When the resource includes a computer processor, the data processing device migrates or restarts a job previously executing on a failed computer processor to an operational computer processor.

In some implementations, the data processing device determines whether the resource failure is correlated to any other resource failures within the distributed system based on a system hierarchy of the distributed system. The system hierarchy includes system domains. Each system domain has an active state or an inactive state. The resources belong to at least one system domain. The data processing device determines the resource failure as correlated to other resource failures, when a statistically significant number of the resources having failures reside in the same system domain or when the resource resides in an inactive system domain.

Yet another aspect of the disclosure provides a method for receiving, at a data processing device, a status of a resource of a distributed system. When the status of the resource indicates a resource failure, the method includes executing instructions on the data processing device to determine a correlation between the resource failure and any other resource failures within the distributed system and a time duration of the resource failure. When the resource failure is correlated to other resource failures within the distributed system, and the time duration is greater than a first threshold period of time, the method includes executing, on the data processing device, a remedial action associated with the resource. However, when the resource failure is uncorrelated to other resource failures within the distributed system, and the time duration is greater than a second threshold period of time, the method includes executing, on the data processing device, the remedial action associated with the resource. The first threshold period of time is greater than the second threshold period of time.

In some implementations, when the resource includes non-transitory memory, the method includes initiating data reconstruction as the remedial action for any data stored on the non-transitory memory. However, when the resource includes a computer processor, the method includes migrating or restarting a job previously executing on a failed computer processor to an operational computer processor.

The method may further include determining whether the resource failure is correlated to any other resource failures within the distributed system based on a system hierarchy of the distributed system. The system hierarchy includes system domains, where each system domain has an active state or an inactive state and the resource belongs to at least one system domain. In some examples, the method may include determining the resource failure as correlated to other resource failures, when a statistically significant number of the resources having failures reside in the same system domain or when the resource resides in an inactive system domain.

The system hierarchy may include system levels (e.g., first through fourth levels). The first system level corresponds to host machines of data processing devices, non-transitory memory devices, or network interface controllers. Each host machine has a system domain. The second system level corresponds to power deliverers, communication deliverers, or cooling deliverers of racks housing the host machines. Each power deliverer, communication deliverer, or cooling deliverer of the rack has a system domain. The third system level corresponds to power deliverers, communication deliverers, or cooling deliverers of cells having associated racks. Each power deliverer, communication deliverer, or cooling deliverer of the cell has a system domain. The fourth system level corresponds to a distribution center module of the cells. Each distribution center module has a system domain.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 4A and 4B are schematic views of an exemplary system hierarchy.

Like reference symbols in the various drawings indicate like elements.

DETAILED DESCRIPTION

Figure 1A:
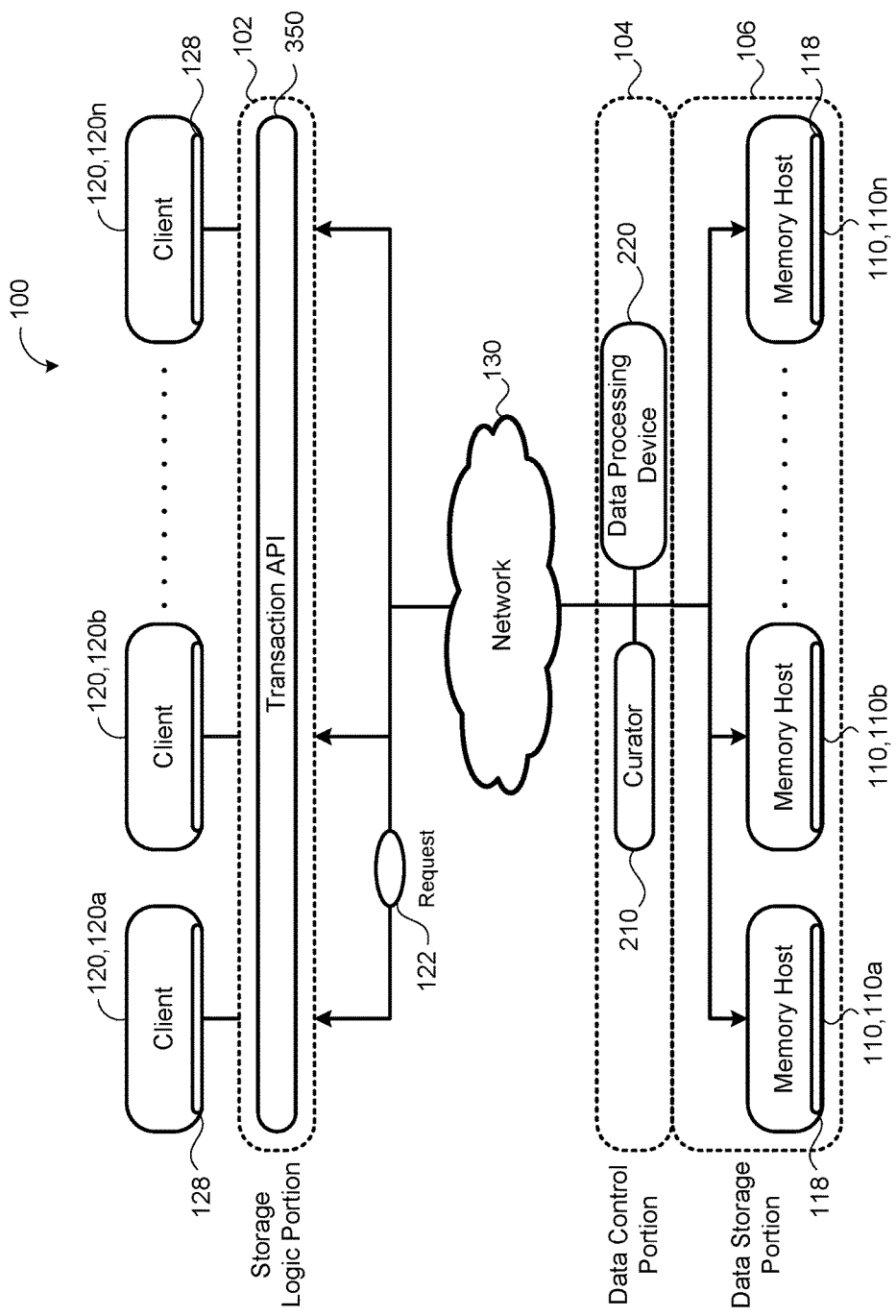
FIG. 1A is a schematic view of an exemplary distributed system.
Figure 1B:
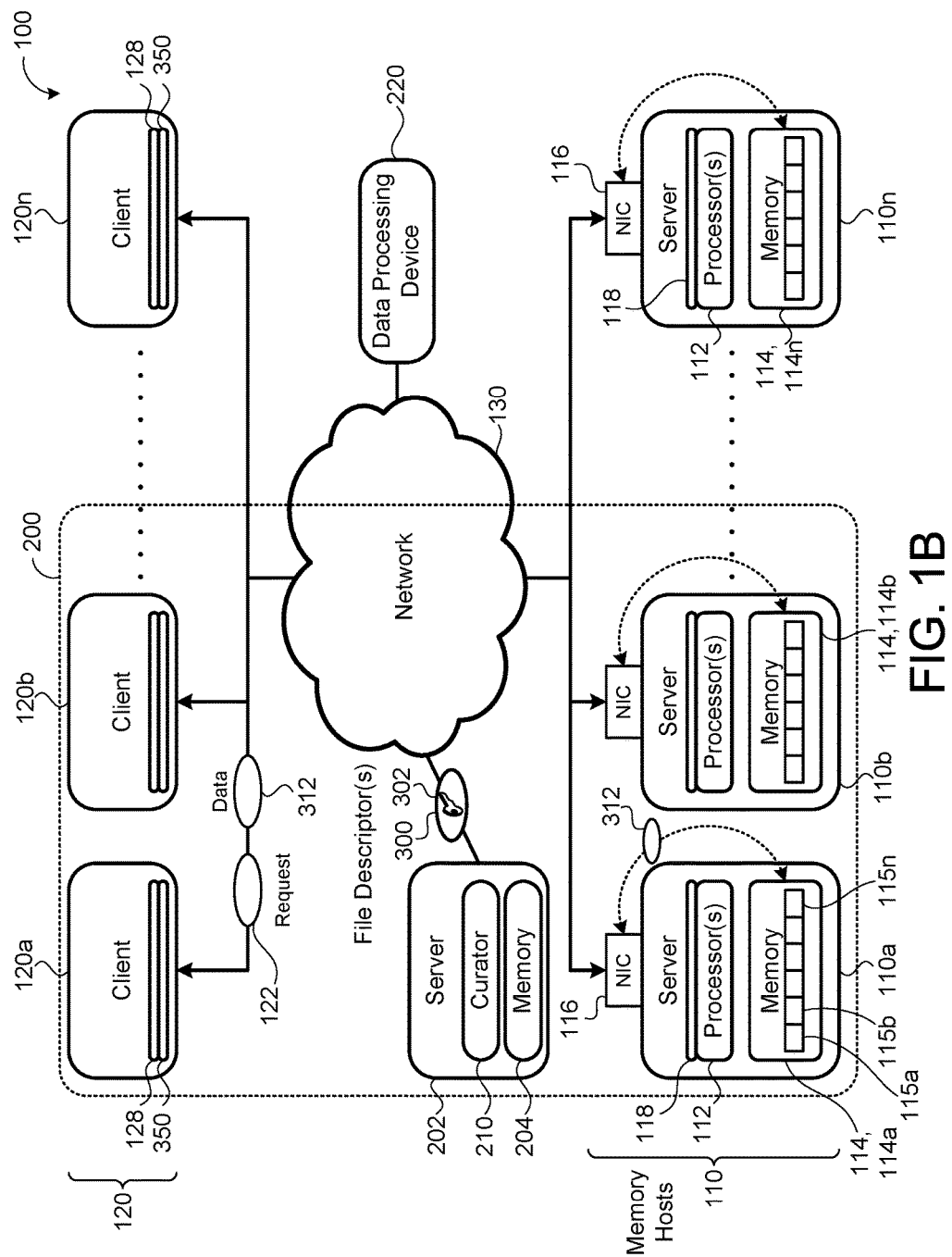
FIG. 1B is a schematic view of an exemplary distributed system having a cell of resources managed by a job processing device.

Referring to FIGS. 1A-1B, in some implementations, a distributed system 100 includes loosely coupled resource hosts 110, 110a-n (e.g., computers or servers), each having a computing resource 112 (e.g., one or more processors or central processing units (CPUs)) in communication with storage resources 114 (e.g., memory, flash memory, dynamic random access memory (DRAM), phase change memory (PCM), and/or disks) that may be used for caching data. A storage abstraction (e.g., key/value store or file system) overlain on the storage resources 114 allows scalable use of the storage resources 114 by one or more clients 120, 120a-n. The clients 120 may communicate with the resource hosts 110 through a network 130 (e.g., via RPC).

The distributed system 100 may include multiple layers of redundancy where data 312 is replicated and/or encoded and stored in multiple data centers. Data centers (not shown) house computer systems and their associated components, such as telecommunications and storage systems 100. Data centers usually include backup power supplies, redundant communications connections, environmental controls (to maintain a constant temperature), and security devices. Data centers can be large industrial scale operations that use a great amount of electricity (e.g., as much as a small town). Data 312 may be located in different geographical locations (e.g., different cities, different countries, and different continents). In some examples, the data centers, or a portion thereof, requires maintenance (e.g., due to a power outage or disconnecting a portion of the storage system 100 for replacing parts, or a system failure, or a combination thereof). The data 312 stored in these data centers, and in particular, the distributed system 100 may be unavailable to users/clients 120 during the maintenance period resulting in the impairment or halt of a user's operations. During maintenance (or unplanned failures) of the distributed system 100, some resource hosts 110 become inactive and unavailable, preventing their access by a user/client 120. It is desirable to determine if the unavailable resource host 110 is associated with other unavailable resource hosts 110 to determine whether to recover/reconstruct data 312 of the unavailable resource host 110 or wait until the unavailable resource hosts 110 becomes active again. If the unavailability of one resource host 110 is correlated to the unavailability of other resource hosts 100, the unavailable resource host 110 may likely become active again soon, so reconstruction of any data 312 associated with the unavailable resource host 110 may not be necessary.

In some implementations, the distributed system 100 is "single-sided," eliminating the need for any server jobs for responding to remote procedure calls (RPC) from clients 120 to store or retrieve data 312 on their corresponding resource hosts 110 and may rely on specialized hardware to process remote requests 122 instead. "Single-sided" refers to the method by which most of the request processing on the resource hosts 110 may be done in hardware rather than by software executed on CPUs 112 of the resource hosts 110. Rather than having a processor 112 of a resource host 110 (e.g., a server) execute a server process 118 that exports access of the corresponding storage resource 114 (e.g., non-transitory memory) to client processes 128 executing on the clients 120, the clients 120 may directly access the storage resource 114 through a network interface controller (NIC) 116 of the resource host 110. In other words, a client process 128 executing on a client 120 may directly interface with one or more storage resources 114 without requiring execution of a routine of any server processes 118 executing on the computing resources 112. This single-sided distributed architecture offers relatively high-throughput and low latency, since clients 120 can access the storage resources 114 without interfacing with the computing resources 112 of the resource hosts 110. This has the effect of decoupling the requirements for storage 114 and CPU cycles that typical two-sided distributed storage systems 100 carry. The single-sided distributed system 100 can utilize remote storage resources 114 regardless of whether there are spare CPU cycles on that resource host 110; furthermore, since single-sided operations do not contend for server CPU 112 resources, a single-sided system can serve cache requests 122 with very predictable, low latency, even when resource hosts 110 are running at high CPU utilization. Thus, the single-sided distributed system 100 allows higher utilization of both cluster storage 114 and CPU 112 resources than traditional two-sided systems, while delivering predictable, low latency.

In some implementations, the distributed system 100 includes a storage logic portion 102, a data control portion 104, and a data storage portion 106. The storage logic portion 102 may include a transaction application programming interface (API) 350 (e.g., a single-sided transactional system client library) that is responsible for accessing the underlying data, for example, via RPC or single-sided operations. The data control portion 104 may manage allocation and access to storage resources 114 with tasks, such as allocating storage resources 114, registering storage resources 114 with the corresponding network interface controller 116, setting up connections between the client(s) 120 and the resource hosts 110, handling errors in case of machine failures, etc. The data storage portion 106 may include the loosely coupled resource hosts 110, 110a-n.

The distributed system 100 may store data 312 in dynamic random access memory (DRAM) 114 and serve the data 312 from the remote hosts 110 via remote direct memory access (RDMA)-capable network interface controllers 116. A network interface controller 116 (also known as a network interface card, network adapter, or LAN adapter) may be a computer hardware component that connects a computing resource 112 to the network 130. Both the resource hosts 110a-n and the client 120 may each have a network interface controller 116 for network communications. A host process 118 executing on the computing processor 112 of the resource host 110 registers a set of remote direct memory accessible regions 115a-n of the memory 114 with the network interface controller 116. The host process 118 may register the remote direct memory accessible regions 115a-n of the memory 114 with a permission of read-only or read/write. The network interface controller 116 of the resource host 110 creates a client key 302 for each registered memory region 115a-n.

The single-sided operations performed by the network interface controllers 116 may be limited to simple reads, writes, and compare-and-swap operations, none of which may be sophisticated enough to act as a drop-in replacement for the software logic implemented by a traditional cache server job to carry out cache requests and manage cache policies. The transaction API 350 translates commands, such as look-up or insert data commands, into sequences of primitive network interface controller operations. The transaction API 350 interfaces with the data control and data storage portions 104, 106 of the distributed system 100.

The distributed system 100 may include a co-located software process to register memory 114 for remote access with the network interface controllers 116 and set up connections with client processes 128. Once the connections are set up, client processes 128 can access the registered memory 114 via engines in the hardware of the network interface controllers 116 without any involvement from software on the local CPUs 112 of the corresponding resource hosts 110.

Referring to FIG. 1B, in some implementations, the distributed system 100 includes multiple cells 200, each cell 200 including resource hosts 110, a curator 210 in communication with the resource hosts 110, and a data processing device 220 in communication with the resource hosts 110 and the curator 210. The curator 210 (e.g., process) may execute on a computing processor 202 (e.g., server having a non-transitory memory 204) connected to the network 130 and manage the data storage (e.g., manage a file system stored on the resource hosts 110), control data placements, and/or initiate data recovery. Moreover, the curator 210 may track an existence and storage location of data 312 on the resource hosts 110. Redundant curators 210 are possible. In some implementations, the curator(s) 210 track the striping of data 312 across multiple resource hosts 110 and the existence and/or location of multiple copies of a given stripe for redundancy and/or performance. In computer data storage, data striping is the technique of segmenting logically sequential data 312, such as a file 310 (FIG. 2), in a way that accesses of sequential segments are made to different physical storage devices 114 (e.g., cells 200 and/or resource hosts 110). Striping is useful when a processing device requests access to data 312 more quickly than a storage device 114 can provide access. By performing segment accesses on multiple devices, multiple segments can be accessed concurrently. This provides more data access throughput, which avoids causing the processor to idly wait for data accesses.

In some implementations, the transaction API 350 interfaces between a client 120 (e.g., with the client process 128) and the curator 210. In some examples, the client 120 communicates with the curator 210 through one or more remote procedure calls (RPC). In response to a client request 122, the transaction API 350 may find the storage location of certain data 312 on resource host(s) 110 and obtain a key 302 that allows access to the data 312. The transaction API 350 communicates directly with the appropriate resource hosts 110 (via the network interface controllers 116) to read or write the data 312 (e.g., using remote direct memory access). In the case that a resource host 110 is non-operational, or the data 312 was moved to a different resource host 110, the client request 122 fails, prompting the client 120 to re-query the curator 210.

Figure 2:
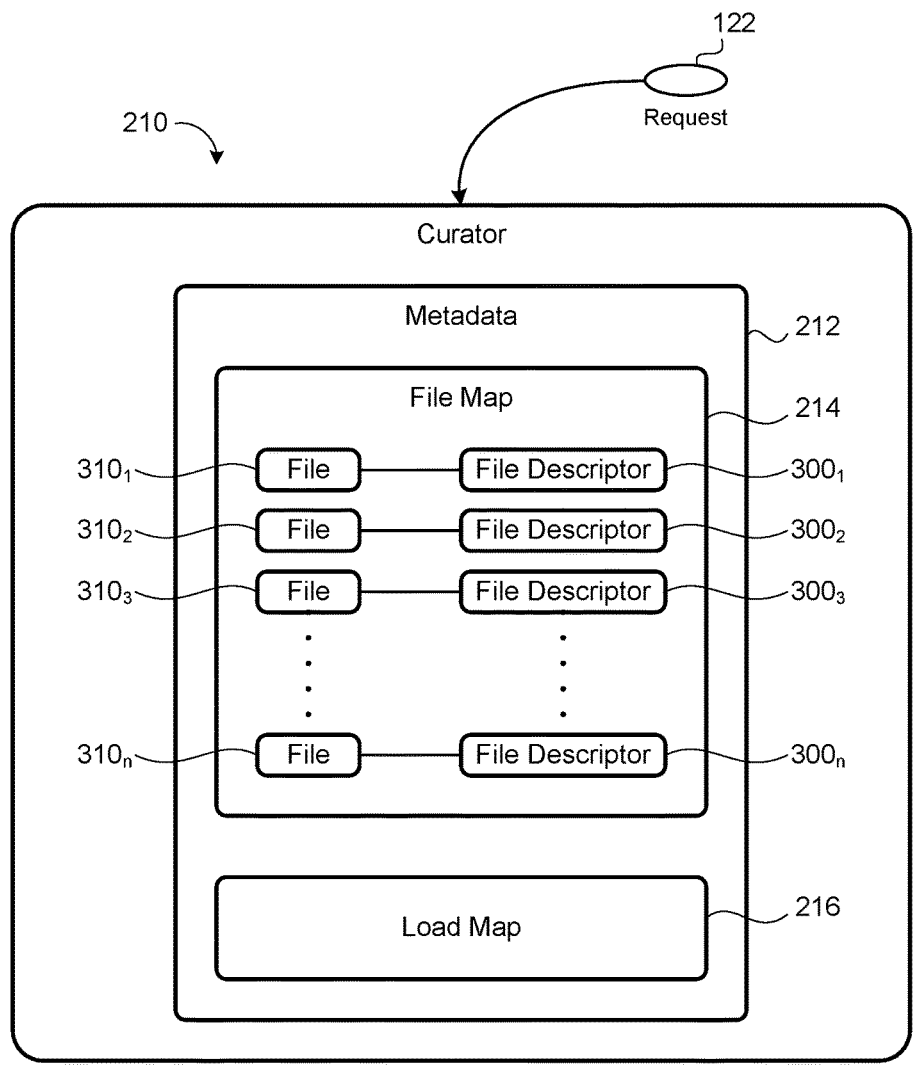
FIG. 2 is a schematic view of an exemplary curator for a distributed storage system.

Referring to FIG. 2, in some implementations, the curator 210 stores and manages file system metadata 212. The metadata 212 may include a file map 214 that maps files $310_{1-n}$ to file descriptors $300_{1-n}$. The curator 210 may examine and modify the representation of its persistent metadata 212. The curator 210 may use three different access patterns for the metadata 212: read-only; file transactions; and stripe transactions.

Figure 3A:
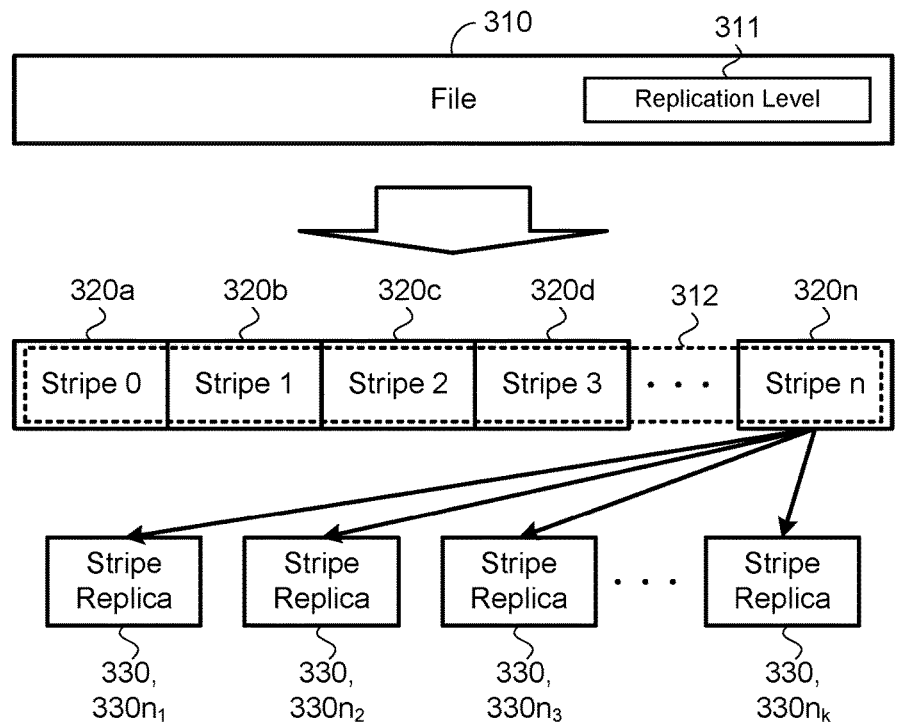
FIG. 3A is a schematic view of an exemplary file split into replicated stripes.
Figure 3B:
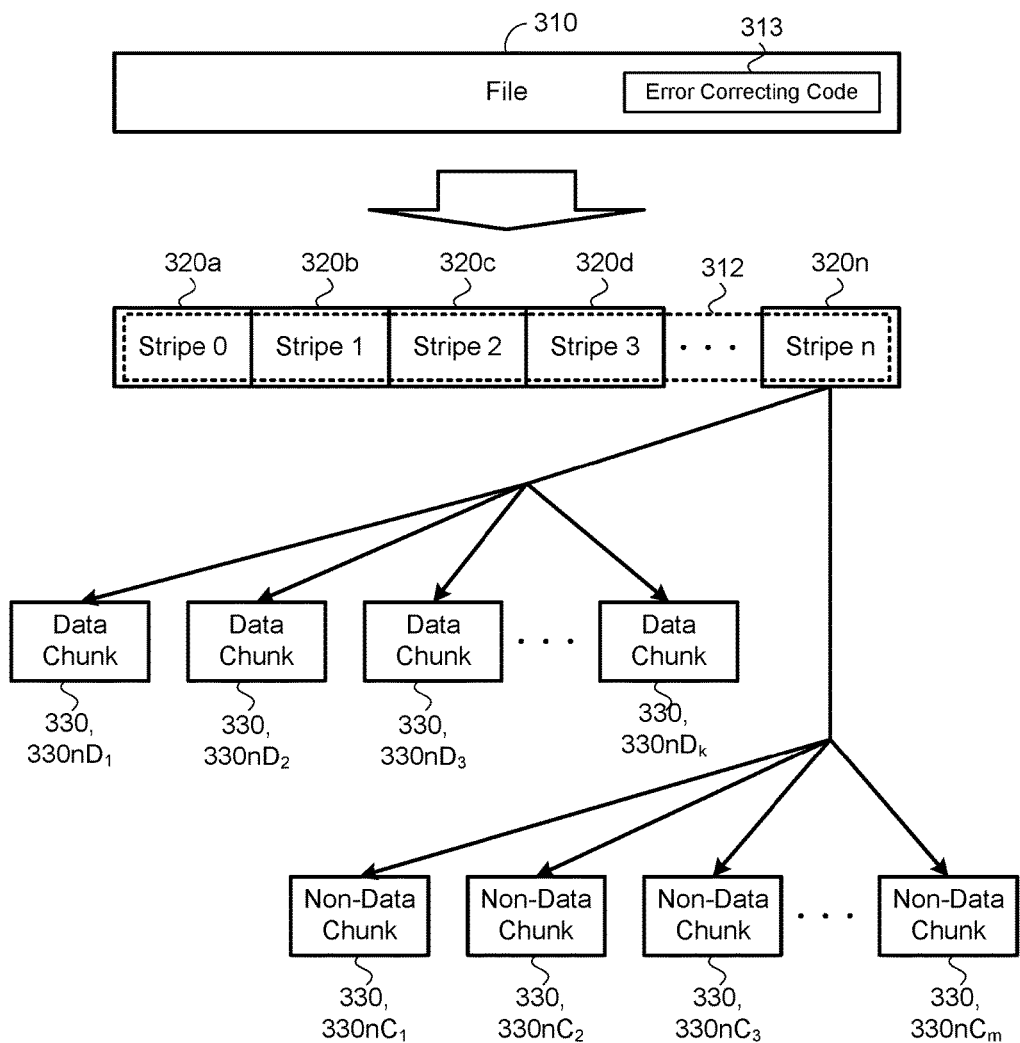
FIG. 3B is a schematic view of an exemplary file split into data chunks and non-data chunks.

Referring to FIGS. 3A-3B, data 312 may be one or more files 310, where each file 310 has a specified replication level 311 and/or error-correcting code 313. The curator 210 may divide each file 310 into a collection of stripes 320, with each stripe 320 being encoded independently from the remaining stripes 320. For a replicated file 310 (FIG. 3A), each stripe 320 is a single logical chunk that the curator 210 replicates as stripe replicas 330$n$ and stores on multiple storage resources 114. In that scenario, a stripe replica 330$n$ is also referred to as a chunk 330. For an erasure encoded file 310 (FIG. 3B), each stripe 320 consists of multiple data chunks 330$nd$ and non-data chunks 330$nc$ (e.g., code chunks) that the curator 210 places on multiple storage resources 114, where the collection of data chunks 330$nd$ and non-data chunks 330$nc$ forms a single code word. In general, the curator 210 may place each stripe 320 on storage resources 114 independently of how the other stripes 320 in the file 310 are placed on the storage resources 114. The error-correcting code 313 adds redundant data, or parity data to a file 310, so that the file 310 can later be recovered by a receiver even when a number of errors (up to the capability of the code being used) were introduced. The error-correcting code 313 is used to maintain data 312 integrity in storage devices, to reconstruct data 312 for performance (latency), or to more quickly drain machines.

As shown in FIG. 3B, each stripe 320 is divided into data-chunks 330$nd$ and non-data chunks 330$nc$ based on an encoding level, e.g., Reed-Solomon Codes, nested codes, layered codes or other erasure coding. The non-data chunks 330$nc$ may be code chunks 330$nc$ (e.g., for Reed Solomon codes). In other examples, the non-data chunks 330$nc$ may be code-check chunks 330$n$CC, word-check chunks 330$n$WC, and code-check-word-check chunks 330$n$CCWC (for layered or nested coding).

A data chunk 330$nd$ is a specified amount of data 312. In some implementations, a data chunk 330$nd$ is a contiguous portion of data 312 from a file 310. In other implementations, a data chunk 330$nd$ is one or more non-contiguous portions of data 312 from a file 310. For example, a data chunk 330$nd$ can be 256 bytes or other units of data 312.

A damaged chunk 330 (e.g., data chunk 330$nd$ or non-data chunk 330$nc$) is a chunk 330 containing one or more errors. Typically, a damaged chunk 330 is identified using an error detecting code 313. For example, a damaged chunk 330 can be completely erased (e.g., if the chunk 330 was stored in a hard drive destroyed in a hurricane), or a damaged chunk 330 can have a single bit flipped. A healthy chunk 330 is a chunk 330 that is not damaged. A damaged chunk 330 can be damaged intentionally, for example, where a particular resource host 110 is shut down for maintenance. In that case, damaged chunks 330 can be identified by identifying chunks 330 that are stored at resource hosts 110 that are being shut down.

The non-data chunks 330$nc$ of a file 310 include an error-correcting code chunk 313. The error-correcting code chunks 313 include a chunk 330 of data 312 based on one or more data-chunks 330$nd$. In some implementations, each code chunk 330$nc$ is the same specified size (e.g., 256 bytes) as the data chunks 330$nd$. The code chunks 330$nc$ are generated using an error-correcting code 313, e.g., a Maximal Distance Separable (MDS) code. Examples of MDS codes include Reed-Solomon codes. Various techniques can be used to generate the code chunks 330$nc$. In general, any error-correcting code 313 can be used that can reconstruct d data chunks 330$nd$ from any set of d unique, healthy chunks 330 (either data chunks 330$nd$ or code chunks 330$nc$).

A codeword is a set of data chunks 330$nd$ and code chunks 330$nc$ based on those data chunks 330$nd$. If an MDS code is used to generate a codeword containing d data chunks 330$nd$ and n code chunks 330$nc$, then all of the chunks 330 (data or code) can be reconstructed as long as any d healthy chunks 330 (data or code) are available from the codeword.

Referring to FIGS. 4A-4B, the data processing device 220 may determine a system hierarchy 400 of the distributed system 100 to identify the levels (e.g., levels 1-4) at which maintenance or failure may occur without affecting a user's access to stored data 312. Maintenance may include power maintenance, cooling system maintenance, networking maintenance, updating or replacing parts, or other maintenance or power outage affecting the distributed system 100. The system hierarchy 400 may include maintenance units/system domains 402 for the various components and resources of the distributed system 100. The system domains 402 may be overlapping or non-overlapping, depending on the nature of the components. For example, a power domain may not align with a networking domain.

The data processing device 220 may determine or receive a system hierarchy 400 of the distributed system 100 to identify the levels (e.g., levels 1-4) at which maintenance may occur without affecting a user's access to stored data 312. Maintenance or failures (strict hierarchy 400$a$ (FIG. 4A), non-strict hierarchy 400$b$ (FIG. 4B)) may include power maintenance/failure, cooling system maintenance/failure, networking maintenance/failure, updating or replacing parts, or other maintenance or power outage affecting the distributed system 100. Maintenance may be scheduled and in some examples, an unscheduled system failure may occur.

The system hierarchy 400 includes system levels (e.g., levels 1-4) with maintenance units/system domains 402 spanning one or more system levels 1-4. Each system domain 402 has an active state or an inactive state. A distribution center module 410 includes one or more cells 420, 420$a$-$n$, and each cell 420 includes one or more racks 430 of resource hosts 110. Each cell 420 also includes cell cooling 422, cell power 424 (e.g., bus ducts), and cell level networking 426 (e.g., network switch(es)). Similarly, each rack 430 includes rack cooling 432, rack power 434 (e.g., bus ducts), and rack level networking 436 (e.g., network switch(es)).

The system levels may include first, second, third, and fourth system levels 1-4. The first system level 1 corresponds to resource hosts or host machines 110, 110$a$-$n$ of data processing devices 112, non-transitory memory devices 114, or network devices 116 (e.g., NICs). Each host machine/resource host 110 has a system domain 402. The second system level 2 corresponds to racks 430, 430$a$-$n$ and cooling deliverers 432, power deliverers 434 (e.g., bus ducts), or communication deliverers 436 (e.g., network switches and cables) of the host machines 110 at the rack level. Each rack 430 or rack level-cooling deliverer 432, -power deliverer 434, or -communication deliverer 436 has a system domain 402. The third system level 3 corresponds to any cells 420, 420a-n of the distribution center module 410 and the cell cooling 422, cell power 424, or cell level networking 426 supplied to the associated racks 430. Each cell 420 or cell cooling 422, cell power 424, or cell level networking 426 has a system domain 402. The fourth system level 4 corresponds to the distribution center module 410. Each distribution center 410 module has a system domain 402.

FIG. 4A shows a strict hierarchy 400a where each hierarchy component (e.g., a resource host 110, a rack 430, a cell 420, or a distribution center module 410) of the system hierarchy 400 depends on one other hierarchy component 110, 410, 420, 430. While FIG. 4B shows a non-strict hierarchy 400b, where one hierarchy component 110, 410, 420, 430 has more than one input feed. In some examples, the data processing device 220 stores the system hierarchy 400 on non-transitory memory 204. For example, the data processing device 220 maps a first resource host 110 (and its corresponding processor resource 112a and storage resource 114a) to a first rack 430a, the first rack 430a to a first bus duct 420a, and the first bus duct 420a to a first distribution center module 410a.

The data processing device 220 determines, based on the mappings of the hierarchy components 110, 410, 420, 430, which resource hosts 110 are inactive when a hierarchy component 110, 410, 420, 430 undergoes maintenance. Once the data processing device 220 maps the system domains 402 to the resource hosts 110 (and therefore to their corresponding processor resources 112a and storage resources 114a), the data processing device 220 determines a highest level (e.g., levels 1-4) at which maintenance can be performed while maintaining processor or data availability.

A system domain 402 includes a hierarchy component 110, 410, 420, 430 undergoing maintenance and any hierarchy components 110, 410, 420, 430 depending therefrom. Therefore, when one hierarchy component 110, 410, 420, 430 undergoes maintenance that hierarchy component 110, 410, 420, 430 is inactive and any other hierarchy components 110, 410, 420, 430 in the system domain 402 of the hierarchy component 110, 410, 420, 430 are also inactive. For example, when a resource host 110 is undergoes maintenance, a level 1 system domain 402a, which includes the storage device 114, the data processor 112, and the NIC 116, is in the inactive state. When a rack 430 undergoes maintenance, a level 2 system domain 402b, which includes the rack 430 and any resource hosts 110 depending from the rack 430, is in the inactive state. When a cell 420 (for example, to any one of the cell cooling component 422, the bus duct 424, and/or the network switch 426 of the cell component 420a) undergoes maintenance, a level 3 system domain 402c, which includes the cell 420 and any hierarchy components 110, 410, 420, 430 in levels 1 and 2 that depend from the cell component 420, is in the inactive state. Finally, when a distribution center module 410 undergoes maintenance, a level 4 system domain 402, 402d, which includes the distribution center module 410a and any hierarchy components 110, 410, 420, 430 in levels 1 to 3 depending from the distribution center module 410, is in the inactive state.

In some examples, as shown in FIG. 4B, a non-strict hierarchy component 410, 420, 430, 114 may have dual feeds, i.e., the hierarchy component 110, 410, 420, 430 depends on two or more other hierarchy components 110, 410, 420, 430. For example, a cell 420 may have a feed from two distribution center modules 410; and/or a rack 430 may have a dual feed from two cells 420. As shown, a level 3 system domain 402c may include two racks 430a, 430n, where the second rack 430n includes two feeds from two cells 420a, 420n. Therefore, the second rack 430n is part of two system domains 402ca and 402cb. Therefore, the lower levels of the system hierarchy 400 are maintained without causing the loss of the higher levels of the system hierarchy 400. This causes a redundancy in the system 100, which allows for data accessibility. In particular, the distribution center module 410 may be maintained without losing any of the cells 420 depending from it. In some examples, the racks 430 include a dual-powered rack that allows the maintenance of the bus duct 424 without losing power to the dual-powered racks 430 depending from it. In some examples, system domains 402 that may be maintained without causing outages are ignored when distributing chunks 330 to allow for maintenance; however, the ignored system domains 402 may be included when distributing the chunks 330 since an unplanned outage may still cause the loss of chunks 330.

In some examples, a cooling device, such as the cell cooling 422 and the rack cooling 432, are used to cool the cell components 420 and the racks 430, respectively. The cell cooling component 422 may cool one or multiple cell components 420. Similarly, a rack cooling component 432 may cool one or more racks 430. The data processing device 220 stores the association of the resource hosts 110 with the cooling devices (i.e., the cell cooling 422 and the rack cooling 432). In some implementations, the data processing device 220 considers all possible combinations of maintenance that might occur within the storage system 100 to determine a system hierarchy 400 or a combination of maintenance hierarchies 400. For example, a system hierarchy 400 where one or more cooling devices 422, 432 fail, or a system hierarchy 400 where the network devices 116, 426, 436 fail, or a system hierarchy 400 where the power distribution 424, 434 fails.

Therefore, when a hierarchy component 110, 410, 420, 430 in the storage system 100 undergoes maintenance that hierarchy component 110, 410, 420, 430 and any hierarchy components 110, 410, 420, 430 that are mapped to or depending from that hierarchy component 110, 410, 420, 430 are in an inactive state. A hierarchy component 110, 410, 420, 430 in an inactive state is inaccessible by a user 120, while a hierarchy component 110, 410, 420, 430 in an active state is accessible by a user 120, allowing the user 120 to process/access data 312 stored/supported/maintained by that hierarchy component 110, 410, 420, 430. As previously mentioned, during the inactive state, a user 120 is incapable of accessing the resource host 110 associated with the system domains 402 undergoing maintenance; and therefore, the client 120 is incapable of accessing the files 310 (i.e., chunks 330, which include stripe replicas 330n, data chunks 330nd and non-data chunks 330nc).

In some implementations, the data processing device 220 restricts a number of chunks 330 distributed to storage devices 114 and/or processing jobs distributed to data processors 112 of any one system domain 402, e.g., based on the mapping of the hierarchy components 110, 410, 420, 430. Therefore, if a level 1 system domain 402 is inactive, the curator 210 maintains accessibility to the file 310 (or stripe 320) although some chunks 330 may be inaccessible. In some examples, for each file 310 (or stripe 320), the data processing device 220 determines a maximum number of chunks 330 that may be placed within any storage device 114 within a single system domain 402, so that if a system domain 402 associated with the storage device 114 storing chunks 330 for a file 310 is undergoing maintenance, a client 120 may still retrieve the file 310. The maximum number of chunks 330 ensures that the data processing device 220 is capable of reconstructing the file 310 although some chunks 330 may be unavailable. In some examples, the maximum number of chunks 330 is set to a lower threshold to accommodate for any system failures, while still being capable of reconstructing the file 310 from the chunks 330. When the data processing device 220 places chunks 330 on the storage devices 114, the data processing device 220 ensures that within a stripe 320, no more than the maximum number of chunks 330 are inactive when a single system domain 402 undergoes maintenance. Moreover, the data processing device 220 may also restrict the number of processing jobs on a data processor 112 of a resource host 110 within a system domain 402, e.g., based on the mapping of the hierarchy components 110, 410, 420, 430. Therefore, if a level 1 system domain 402 is inactive, the data processing device 220 maintains accessibility to the processing jobs (e.g., by migrating or restarting the jobs on other data processing devices 112 that are available) although some of the processors 112 of the resource hosts 110 are inactive.

Figure 5A:
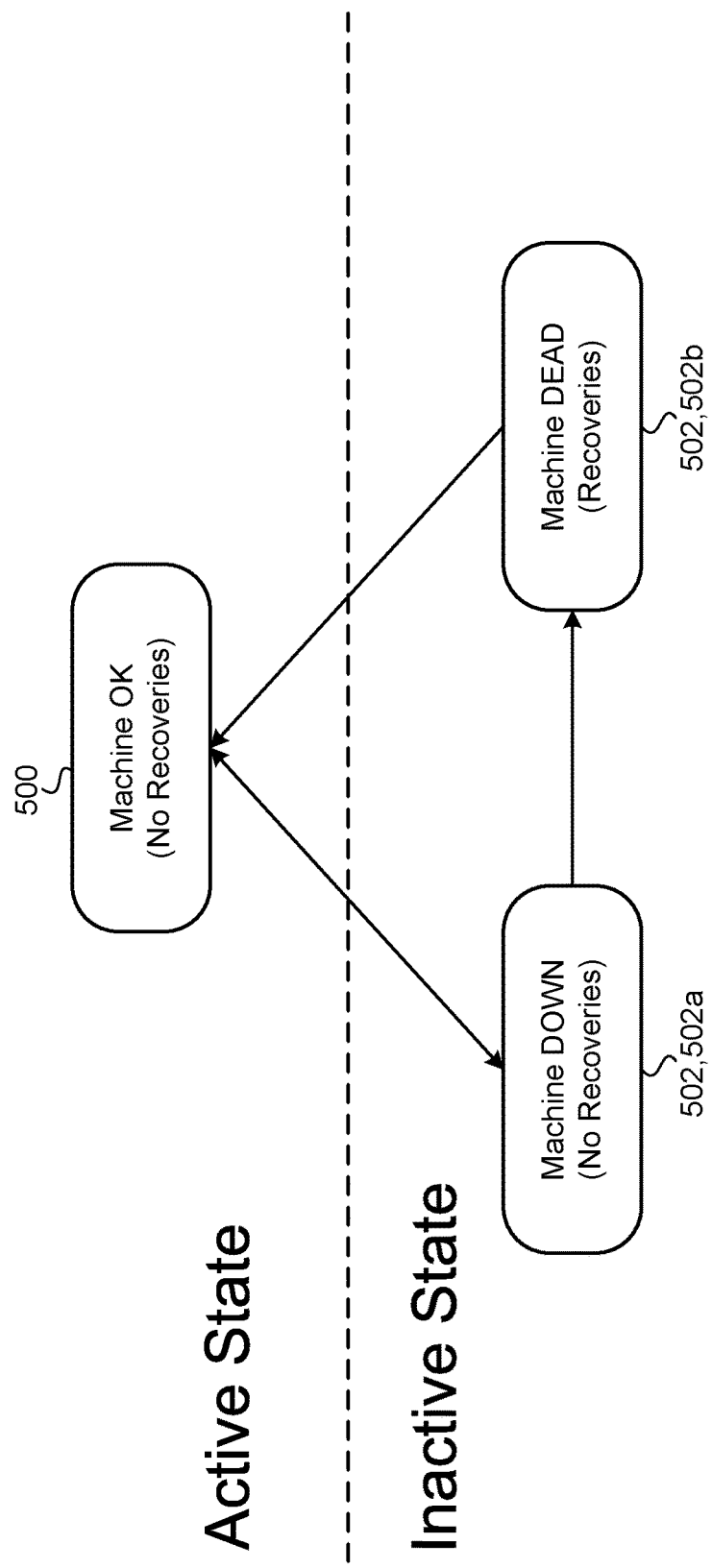
FIG. 5A is a schematic view of an exemplary transition between the active and inactive states of a component.

Referring to FIG. 5A, in some implementations, and as previously discussed, the system 100 may undergo maintenance or unplanned failures, which cause one or more system domains 402 to be in an inactive state 502. The inactive state 502 may include two phases, a down phase 502a and a dead phase 502b. The down-phase 502a is a transition phase between the active state 500 and the dead phase 502b (of the inactive state 502). During the down phase 502a, the system 100 waits for the hierarchy component 110, 410, 420, 430 to go back to the active state 500; however, during the dead phase 502b, the system 100 considers the data 312 stored on the storage devices 114 and the processing jobs 122 being processed on the data processors 112 as lost data 312 and lost processes, and begins to reconstruct the data 312 or re-initiate the processes of the jobs 122.

Figure 5B:
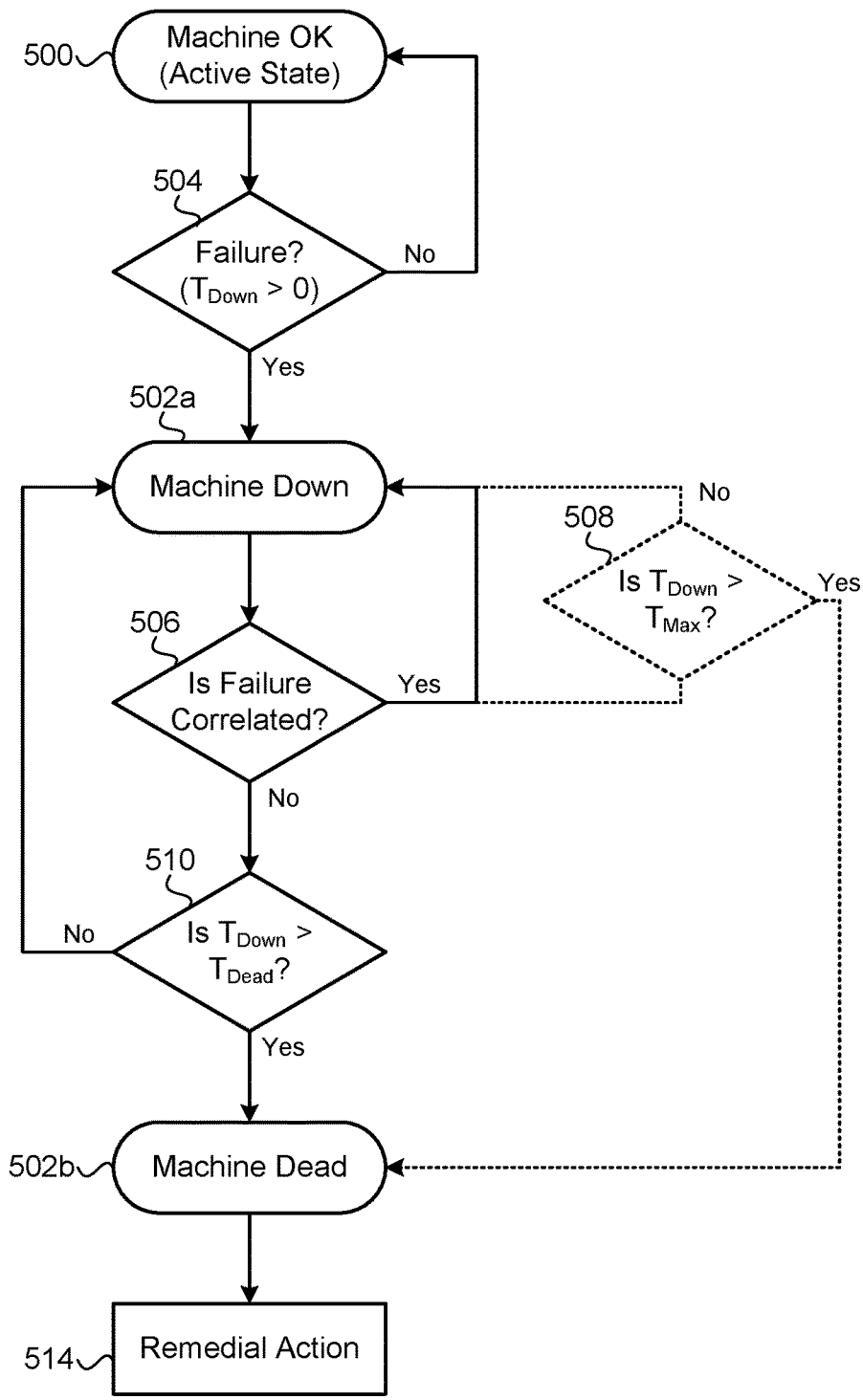
FIG. 5B is a flow diagram of an exemplary arrangement of operations for delaying unnecessary data recovery in a distributed system.

Referring to FIGS. 5A and 5B, in some implementations, the data processing device 220 monitors the system domains 402 including the hierarchy components 110, 410, 420, 430 of the system domains 402 and receives a status of the hierarchy components 110, 410, 420, 430 (e.g., active state 500 or inactive state 502). In some examples, the data processing device 220 monitors the hierarchy components 110, 410, 420, 430 periodically. In other examples, the hierarchy components 110, 410, 420, 430 send the data processing device 220 a status update when a change in a status of one of the hierarchy components 110, 410, 420, 430 occurs. When the system 100 is not undergoing maintenance or any system failures, the hierarchy components 110, 410, 420, 430 of the system domains 402 are in an active state 500.

Therefore, at decision block 504, the data processing device 220 determines if one of the hierarchy components 110, 410, 420, 430 remains in the active state 500 or is experiencing a failure, i.e., the hierarchy component 110, 410, 420, 430 is no longer in the active state 500. If the data processing device 220 determines that the hierarchy component 110, 410, 420, 430 remains in the active state 500 (i.e., no failure occurred), the data processing device 220 maintains the status of the hierarchy component 110, 410, 420, 430 as active 500.

If the data processing device 220 determines that the hierarchy component 110, 410, 420, 430 is not in an active state, i.e., a failure occurred, then the data processing device 220 updates the status of the hierarchy component 110, 410, 420, 430 to a component down state 502a, the component is to be a down-component 110, 410, 420, 430 in the down state 502a. As previously mentioned, the down state 502a is a transition between the active state 500 and the dead phase 502b. Therefore, at decision block 506, the data processing device 220 determines if the failure of the down-component 110, 410, 420, 430 is correlated to one or more other down-components 110, 410, 420, 430 having failures within the distributed system 100. If so, then the data processing device 220 maintains the down-state status 502a of the down-component 110, 410, 420, 430.

In some implementations, at decision block 506, if the data processing device 220 determines that the failure of the down-component 110, 410, 420, 430 is correlated to one or more other down-components 110, 410, 420, 430 within the distributed storage system 100, then the data processing device 220 determines, at block 508, if the down-component 110, 410, 420, 430 is inactive for a period of time $T_{Down}$ that is greater than a threshold period of time $T_{Max}$. If the inactive period of time $T_{Down}$ is greater than the threshold period of time $T_{Max}$ ($T_{Down} > T_{Max}$), then the data processing device 220 updates the status of the down-component 110, 410, 420, 430 to an inactive dead-state 502b, and the data processing device 220 initiates execution of a remedial action associated with the resource lost at block 514. The threshold period of time $T_{Max}$ at block 508 delays the transition of the down-component 110, 410, 420, 430 from the down state 502a to the dead state 502b, therefore, delaying execution of the remedial action when the failure of the down-component 110, 410, 420, 430 is associated with failures of other down-components 110, 410, 420, 430 of the distributed system 100. This provides a delay in resource utilization (e.g., storage device 114 and processor 212) during the remedial action. In some examples, the system 100 avoids reconstructing many bytes-terabytes of data 312 unnecessarily and is able to run the data centers at a higher user load, thereby extending the data center's effective capacity. The data processing device 220 determines a new correlation decision each time at block 506. As such, a correlated failure in one decision cycle at block 506 may become an uncorrelated failure at a subsequent decision cycle at block 506 (e.g., a few minutes later).

As previously explained, a resource host 110 includes storage devices 114 for storing chunks 330 of a file 310, and processors 112 for executing jobs 122. Therefore, a remedial action may be a storage-remedial action or a processor-remedial action. During a storage-remedial action for the storage devices 114, the data processing device 220 reconstructs a file 310, or more specifically reconstructs the stripes 320 of a file 310, where each stripe 320 includes chunks 330. Therefore, the data processing device 220 reconstructs the missing chunks 330 of a stripe 320 using healthy chunks 330 of the stripe 320. A processor-remedial action for a data processor 112 of a resource host 110 is different than the storage remedial action for the storage devices 114. During a processor-remedial action, the data processing device 220 migrates or restarts a job 122 that was previously executing on a down-data processor 112 (e.g., failed data processor 112 in an inactive state 502) to an operational-data processor 112 in an active state 500. In some examples, processor-remedial actions are not delayed, because the resource cost of a processor-remedial action is low compared to a storage-remedial action.

Referring back to decision block 508, when the data processing device 220 determines that the failure of the down-component 110, 410, 420, 430 is not correlated to another one or more down-components 110, 410, 420, 430, then the data processing device 220, at decision block 510, determines if the down-component 110, 410, 420, 430 has been inactive for a period of time $T_{Down}$ greater than a dead-phase threshold time $T_{Dead}$ ($T_{Down}$>$T_{Dead}$), then the data processing device 220 updates the status of the down-component 110, 410, 420, 430 to a dead-state 502b and the data processing device 220 executes a remedial action associated with the resource 110 to recover the data 312 or processing job that was lost on the down-component 110, 410, 420, 430 at block 514 that transitioned to the dead-state 502b.

In some implementations, the system 100 (e.g., the data processing device 220) determines if the down-component 110, 410, 420, 430 is correlated to any other down-components 110, 410, 420, 430 within the distributed system 100. A correlated failure may be a failure of a down-component 110, 410, 420, 430 within the distributed system 100, more specifically the system hierarchy 400, that is similar to other failures experienced by other down-components 110, 410, 420, 430. The failures may include failures of components within the same level of the system hierarchy 400, failures of components within the same vicinity, failures of components associated with the same system domain 402, same type of component, or any other similarity of the component 110, 410, 420, 430.

Figure 6:
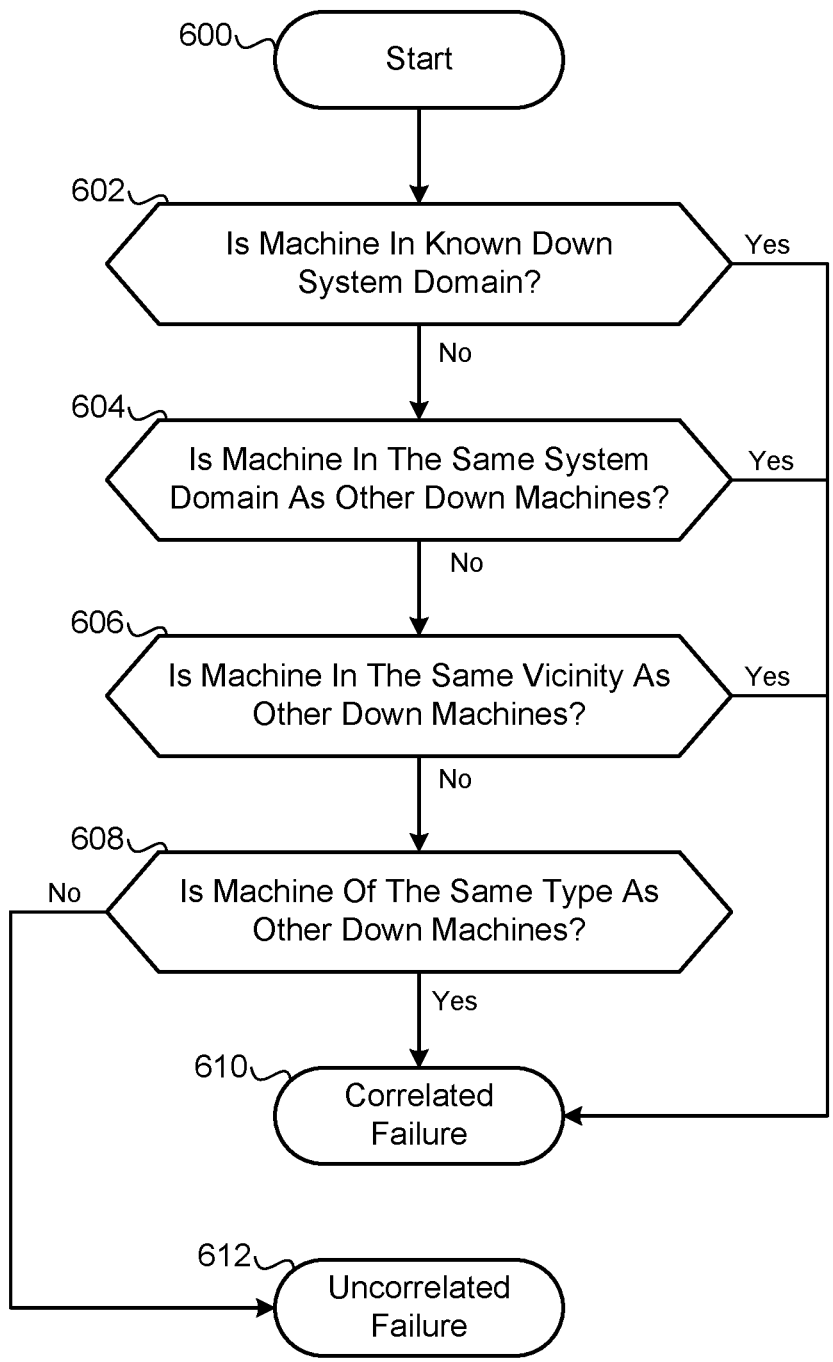
FIG. 6 is a flow diagram of an exemplary arrangement of operation to determine a correlated failure.

Referring to FIG. 6, in some implementations, the system 100 determines, if a down-component 110, 410, 420, 430 is part of a larger correlated failure by determining if the down-component 110, 410, 420, 430 is in a known inactive system domain 402, at block 602. If the down-component 110, 410, 420, 430 is in a known inactive system domain 402 (down-state 502a), then the data processing device 220 determines that the down-component 110, 410, 420, 430 is part of a larger correlated failure, and therefore, the data processing device 220 delays transitioning the down-component 110, 410, 420, 430 from the down-state 502a to the dead-state 502b, because the down-component 110, 410, 420, 430 is associated with failures of other down-components 110, 410, 420, 430 of the distributed system 100. However, if at block 602, the down-component 110, 410, 420, 430 is not associated with a known inactive system domain 402, the system 100 considers the next block (block 604). For example, referring back to FIG. 4A, if the down-component 110, 410, 420, 430 is a resource host 110a (e.g., the NIC 116, the storage device 114, or the data processor 112) of a system hierarchy 402c, and the resource host 110a becomes inactive or down, then the data processing device 220 determines if the system domains 402 that includes the resource host 110a (of system domain 402c) is inactive. Therefore, the data processing device 220 determines if the level 2 system domain 402b that includes the resource host 110a, or the cell component 420a that includes the resource host 110a, or the distribution center module 410 are in the inactive state. If one of those system domains 402 includes the resource host 110a that is experiencing a failure, then that resource host 110a is correlated to failures of other down-components 110, 410, 420, 430, because a failure in any one of those components results in a failure of all the resource hosts 110 that depend on that down-component 410, 420, 430.

Referring back to FIG. 6, at block 604, the data processing device 220 determines if the down-component 110, 410, 420, 430 is associated with other down-components 110, 410, 420, 430 in the same system domain 402. If so, then the data processing device 220 determines that the down-component 110, 410, 420, 430 is part of a larger correlated failure, and therefore, the data processing device 220 delays transitioning the down-component 110, 410, 420, 430 from the down state 502a to the dead state 502b, because the down-component 110, 410, 420, 430 is associated with failures of other down-components 110, 410, 420, 430 of the distributed system 100. If not, then the data processing device 220 moves to the next block 606. For example, referring back to FIG. 4A, if a resource host 110 in level 1 is in the down state, the data processing device 220 considers other resource hosts 110 that are in level 1 and depend from the same system hierarchy 402 as the down-resource host 110. In some implementations, the data processing device 220 determines if a statistically significant number of down-components 110, 410, 420, 430 having failures reside in the same system domain 402 as the down-component 110, 410, 420, 430. A statistically significant number is the probability that an effect is not likely due to just change alone. The statistically significant number is considered important because it has been predicted as unlikely to have occurred by chance alone.

Referring back to FIG. 6, at block 606, the data processing device 220 determines if the down-component 110, 410, 420, 430 is in the same vicinity (e.g., physical location) as other down-components 110, 410, 420, 430 of the distributed system 100. For example, the data processing device 220 may consider the proximity of storage devices 114 within a rack 430. If so, then the system 100 determines that the down-component 110, 410, 420, 430 is part of a larger correlated failure; delaying the transition from the down state 502a to the dead state 502b. However, if the down-component 110, 410, 420, 430 is not part of a larger correlated failure, then the system 100 moves to block 608.

At block 608, the data processing device 220 determines if the down-component 110, 410, 420, 430 is the same type as other down-components 110, 410, 420, 430. If so, then the data processing device 220 may determine that the down-component 110, 410, 420, 430 is part of a larger correlated failure, and therefore, the data processing device 220 delays transitioning the down-component 110, 410, 420, 430 from the down-state 502a to the dead-state 502b. However, if not, then the data processing device 220 moves to block 612. The data processing device 220 may use this test in combination with other tests to determine the correlation of failures. For example, referring back to FIG. 4A, if a storage host 110 is in the down state 502a, the data processing device 220 determines if other components are also in the down state 502a, and if those components are resource hosts 110 as well, the down-resource host 110 may be part of a larger correlated failure. However, if a resource host 110a is in the down state 502a, but another resource host 110b sharing the same system hierarchy is not in the down state 502a, then the failure is not part of a larger correlated failure, and might be due to a failure in the resource host 110a itself.

Figure 7:
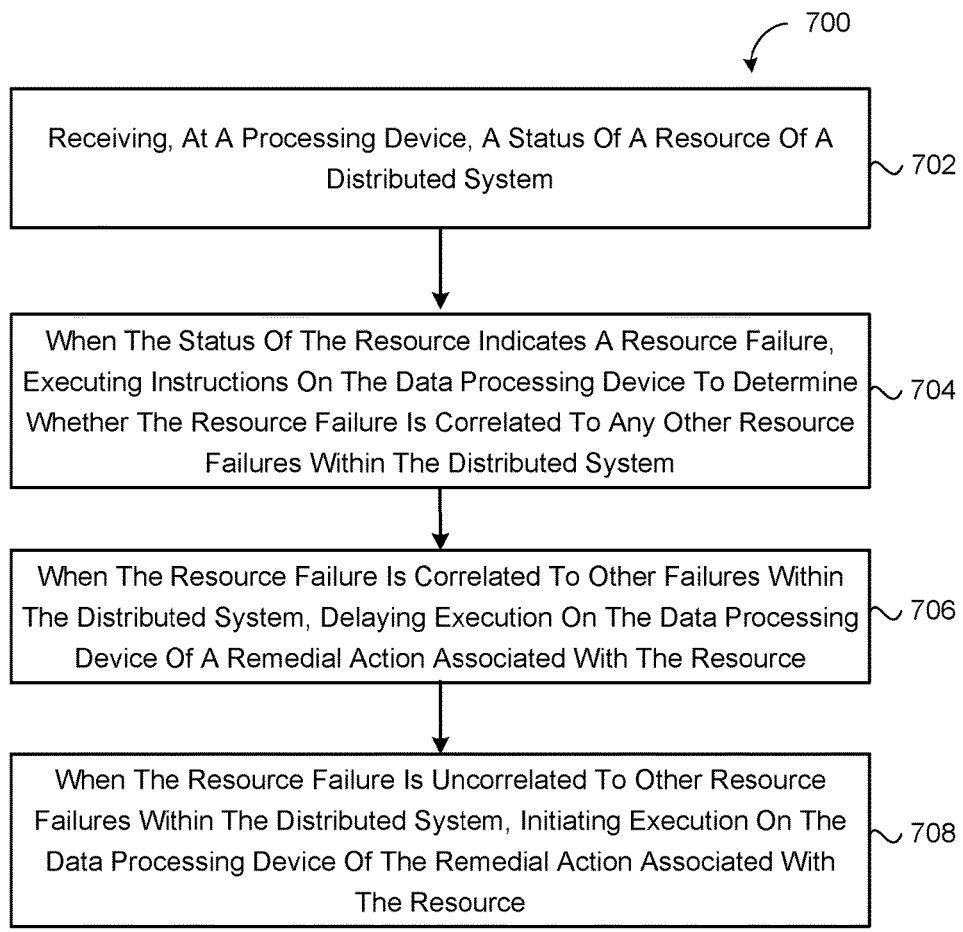
FIGS. 7 and 8 are schematic views of exemplary arrangements of operations for preventing unnecessary data recovery in a distributed system.

Referring to FIG. 7, in some implementations, a method 700 includes receiving 702, at a data processing device 220, a status of a resource 110 (e.g., resource hosts 110 including data processors 112 and storage devices 114) of a distributed system 100. When the status of the resource 110 indicates a resource failure (due to maintenance or system failure), the method 700 includes executing 704 instructions on the data processing device 220 to determine whether the resource failure is correlated to any other resource failures within the distributed system 100. When the resource failure is correlated to other resource failures within the distributed system 100, the method 700 includes delaying 706 execution on the data processing device 220 of a remedial action associated with the resource 110. However, when the resource failure is uncorrelated to other resource failures within the distributed system 100, the method 700 includes initiating 708 execution on the data processing device 220 of the remedial action associated with the resource 110. As previously discussed, a remedial action may be a storage-remedial action or a processor-remedial action. During a storage-remedial action for the storage devices 114, the data processing device 220 reconstructs a file 310, or more specifically reconstructs the stripes 320 of a file 310, where each stripe 320 includes chunks 330. Therefore, the data processing device 220 reconstructs the missing chunks 330 of a stripe 320 using healthy chunks 320 of the stripe 320. A processor-remedial action for a data processor 112 of a resource host 110 is different than the storage remedial action for the storage devices 114. During a processor-remedial action, the data processing device 220 migrates or restarts a job that was previously executing on a down-data processor 112 (e.g., failed data processor 112 in an inactive state 502) to an operational data processor 112 in an active state 500.

In some implementations, when the resource failure is correlated to other resource failures within the distributed system 100, the method 700 includes executing the remedial action on the data processing device 220 after a first threshold period of time $T_{max}$. In addition when the resource failure is uncorrelated to other resource failures within the distributed system 100, the method 700 includes executing the remedial action on the data processing device 220 after a second threshold period of time $T_{Dead}$. The first threshold period of time $T_{max}$ is greater than the second threshold period of time $T_{Dead}$, which causes a delay in the execution of the remedial action and provides a delay in the resource utilization (e.g., storage device 114 or processor 212) during the remedial action. The second threshold period of time $T_{Dead}$ may be between about 15 minutes and about 30 minutes.

The resource 110 may include non-transitory memory 114 or computer processors 112. When the resource 110 is non-transitory memory 114, the method 700 may include initiating data reconstruction as the remedial action for any data 312 stored on the non-transitory memory 114. The data 312 may include chunks 330 of a file 310, where the file 310 is divided into stripes 320 having data chunks 330nd and non-data chunks 330nc (as discussed with reference to FIGS. 3A and 3B). Moreover, when the resource includes a data processor 112, the method 700 includes migrating or restarting a job 122 previously executing on a failed computer processor 112 to an operational computer processor 112.

In some implementations, the method 700 includes determining whether the resource failure is correlated to any other resource failures within the distributed system 100 based on a system hierarchy 400 of the distributed system 100 (e.g., as described with reference to FIGS. 4A and 4B). The system hierarchy 400 includes system domains 402, where each system domain 402 has an active state 500 or an inactive state 502. The resource 110 (e.g., non-transitory memory 114 or computer processor 112) belongs to at least one system domain 402. The method 700 may further include determining the resource failure as correlated to other resource failures, when a statistically significant number of the resources 110 having failures reside in the same system domain 402, or when the resource 110 resides in an inactive system domain 402.

Figure 8:
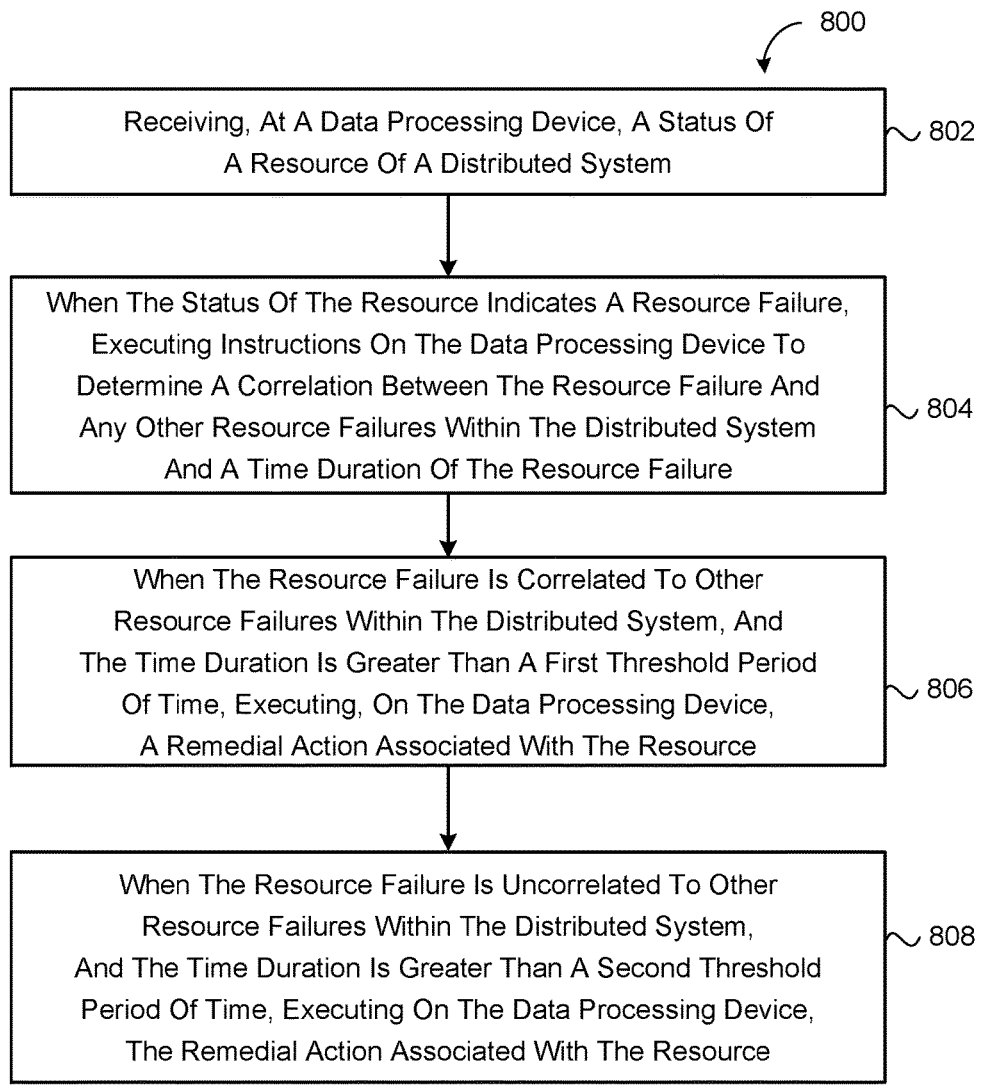

Referring to FIG. 8, in some implementations, a method 800 includes receiving 802, at a data processing device 220, a status of a resource 110 (e.g., resource hosts 110 includes data processors 112 and storage devices 114) of a distributed system 100. When the status of the resource 110 indicates a resource failure (due to maintenance or system failure), the method 800 includes executing 804 instructions on the data processing device 220 to determine a correlation between the resource failure and any other resource failures within the distributed system 100 and a time duration of the resource failure $T_{Down}$. When the resource failure is correlated to other resource failures within the distributed system 100, and the time duration $T_{Down}$ is greater than a first threshold period of time $T_{Max}$, the method 800 includes executing 806, on the data processing device 220, a remedial action associated with the resource 100. However, when the resource failure is uncorrelated to other resource failures within the distributed system 100, and the time duration $T_{Max}$ is greater than a second threshold period of time $T_{Dead}$, the method 800 includes executing 808, on the data processing device 220, the remedial action associated with the resource 110. The first threshold period of time $T_{Down}$ is greater than the second threshold period of time $T_{Max}$.

In some implementations, when the resource includes non-transitory memory 114, the method 800 includes initiating data reconstruction as the remedial action for any data 312 stored on the non-transitory memory 114. However, when the resource includes a computer processor 112, the method 800 includes migrating or restarting a job previously executing on a failed computer processor 112 to an operational computer processor 112.

The method 800 may further include determining whether the resource failure is correlated to any other resource failures within the distributed system 100 based on a system hierarchy 400 of the distributed system 100 (as discussed with reference to FIGS. 4A and 4B). The system hierarchy 400 includes system domains 402, where each system domain 402 has an active state 500 or an inactive state 502 and the resource 110 belongs to at least one system domain 402. In some examples, the method 800 may include determining the resource failure as correlated to other resource failures, when a statistically significant number of the resources 110 having failures reside in the same system domain 402 or when the resource 110 resides in an inactive system domain 402.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
receiving, at a data processing device, a status of a resource of a distributed system;
when the status of the resource indicates a resource failure, executing instructions on the data processing device to determine whether the resource failure is correlated to any other resource failures within the distributed system based on a system hierarchy of the distributed system, the system hierarchy comprising system domains, each system domain having an active state or an inactive state, the resource belonging to at least one system domain, wherein the resource failure is correlated to other resource failures when a statistically significant number of resources having failures reside in a same system domain;
when the resource failure is correlated to other resource failures within the distributed system, delaying execution on the data processing device of a remedial action associated with the resource; and
when the resource failure is uncorrelated to other resource failures within the distributed system, initiating execution on the data processing device of the remedial action associated with the resource.

2. The method of claim 1, further comprising, when the resource comprises non-transitory memory, initiating data reconstruction as the remedial action for any data stored on the non-transitory memory.

3. The method of claim 2, wherein the data comprises chunks of a file, the file divided into stripes comprising data chunks and non-data chunks.

4. The method of claim 1, further comprising, when the resource comprises a computer processor, migrating or restarting a job previously executing on a failed computer processor to an operational computer processor.

5. The method of claim 1, further comprising determining the resource failure as correlated to other resource failures when the resource resides in an inactive system domain.

6. The method of claim 1, wherein the system hierarchy comprises system levels comprising:
a first system level corresponding to host machines of data processing devices, non-transitory memory devices, or network interface controllers, each host machine having a system domain;
a second system level corresponding to power deliverers, communication deliverers, or cooling deliverers of racks housing the host machines, each power deliverer, communication deliverer, or cooling deliverer of the rack having a system domain;
a third system level corresponding to power deliverers, communication deliverers, or cooling deliverers of cells having associated racks, each power deliverer, communication deliverer, or cooling deliverer of the cell having a system domain; and
a fourth system level corresponding to a distribution center module of the cells, each distribution center module having a system domain.

7. A method comprising:
receiving, at a data processing device, a status of a resource of a distributed system;
when the status of the resource indicates a resource failure, executing instructions on the data processing device to determine whether the resource failure is correlated to any other resource failures within the distributed system based on a system hierarchy of the distributed system, the system hierarchy comprising system domains, each system domain having an active state or an inactive state, the resource belonging to at least one system domain;
when the resource failure is correlated to other resource failures within the distributed system, delaying execution on the data processing device of a remedial action associated with the resource until after a first threshold period of time; and
when the resource failure is uncorrelated to the other resource failures within the distributed system, initiating execution on the data processing device of the remedial action associated with the resource after a second threshold period of time,
wherein the first threshold period of time is greater than the second threshold period of time.

8. The method of claim 7, wherein the second threshold period of time is between about 15 minutes and about 30 minutes.

9. A recovery system for a distributed system, the recovery system comprising:
a data processing device in communication with resources of the distributed system, the data processing device receiving a status of a resource of the distributed system;
when the status of the resource indicates a resource failure, the data processing device executing instructions to determine whether the resource failure is correlated to any other resource failures within the distributed system based on a system hierarchy of the distributed system, the system hierarchy comprising system domains, each system domain having an active state or an inactive state, the resource belonging to at least one system domain, wherein the resource failure is correlated to other resource failures when a statistically significant number of resources having failures reside in a same system domain;
when the resource failure is correlated to other resource failures within the distributed system, the data processing device delaying execution of a remedial action associated with the resource; and when the resource failure is uncorrelated to other resource failures within the distributed system, the data processing device initiating execution of the remedial action associated with the resource.

10. The recovery system of claim 9, wherein, when the resource comprises non-transitory memory, the data processing device initiates data reconstruction as the remedial action for any data stored on the non-transitory memory.

11. The recovery system of claim 10, wherein the data comprises chunks of a file, the file divided into stripes comprising data chunks and non-data chunks.

12. The recovery system of claim 9, wherein, when the resource comprises a computer processor, the data processing device migrates or restarts a job previously executing on a failed computer processor to an operational computer processor.

13. The recovery system of claim 9, wherein the data processing device determines the resource failure as correlated to other resource failures, when the resource resides in an inactive system domain.

14. The recovery system of claim 9, wherein the system hierarchy comprises system levels comprising:
   a first system level corresponding to host machines of data processing devices, non-transitory memory devices, or network interface controllers, each host machine having a system domain;
   a second system level corresponding to power deliverers, communication deliverers, or cooling deliverers of racks housing the host machines, each power deliverer, communication deliverer, or cooling deliverer of the rack having a system domain;
   a third system level corresponding to power deliverers, communication deliverers, or cooling deliverers of cells having associated racks, each power deliverer, communication deliverer, or cooling deliverer of the cell having a system domain; and
   a fourth system level corresponding to a distribution center module of the cells, each distribution center module having a system domain.

15. A recovery system for a distributed system, the recovery system comprising:
   a data processing device in communication with resources of the distributed system, the data processing device receiving a status of a resource of the distributed system;
   when the status of the resource indicates a resource failure, the data processing device executing instructions to determine whether the resource failure is correlated to any other resource failures within the distributed system based on a system hierarchy of the distributed system, the system hierarchy comprising system domains, each system domain having an active state or an inactive state, the resource belonging to at least one system domain;
   when the resource failure is correlated to other resource failures within the distributed system, the data processing device delays execution of a remedial action associated with the resource for a first threshold period of time; and
   when the resource failure is uncorrelated to the other resource failures within the distributed system, the data processing device initiates execution of the remedial action associated with the resource after a second threshold period of time,
   wherein the first threshold period of time is greater than the second threshold period of time.

16. The recovery system of claim 15, wherein the second threshold period of time is between about 15 minutes and about 30 minutes.

17. A method comprising:
   receiving, at a data processing device, a status of a resource of a distributed system;
   when the status of the resource indicates a resource failure, executing instructions on the data processing device to determine:
      a correlation between the resource failure and any other resource failures within the distributed system based on a system hierarchy of the distributed system, the system hierarchy comprising system domains, each system domain having an active state or an inactive state, the resource belonging to at least one system domain; and
      a time duration of the resource failure;
   when the resource failure is correlated to other resource failures within the distributed system and the time duration is greater than a first threshold period of time, executing on the data processing device a remedial action associated with the resource; and
   when the resource failure is uncorrelated to other resource failures within the distributed system, and the time duration is greater than a second threshold period of time, executing on the data processing device the remedial action associated with the resource, wherein the first threshold period of time is greater than the second threshold period of time.

18. The method of claim 17, further comprising determining the resource failure as correlated to other resource failures, when the resource resides in an inactive system domain.

19. The method of claim 17, wherein the system hierarchy comprises system levels comprising:
   a first system level corresponding to host machines of data processing devices, non-transitory memory devices, or network interface controllers, each host machine having a system domain;
   a second system level corresponding to power deliverers, communication deliverers, or cooling deliverers of racks housing the host machines, each power deliverer, communication deliverer, or cooling deliverer of the rack having a system domain;
   a third system level corresponding to power deliverers, communication deliverers, or cooling deliverers of cells having associated racks, each power deliverer, communication deliverer, or cooling deliverer of the cell having a system domain; and
   a fourth system level corresponding to a distribution center module of the cells, each distribution center module having a system domain.

20. A method comprising:
   receiving, at a data processing device, a status of a resource of a distributed system;
   when the status of the resource indicates a resource failure, executing instructions on the data processing device to determine:
      a correlation between the resource failure and any other resource failures within the distributed system based on a system hierarchy of the distributed system, the system hierarchy comprising system domains, each system domain having an active state or an inactive state, the resource belonging to at least one system domain; and
      a time duration of the resource failure;

when the resource failure is correlated to other resource failures within the distributed system and the time duration is greater than a first threshold period of time, executing on the data processing device a remedial action associated with the resource;

when the resource failure is uncorrelated to other resource failures within the distributed system, and the time duration is greater than a second threshold period of time, executing on the data processing device the remedial action associated with the resource, wherein the first threshold period of time is greater than the second threshold period of time;

when the resource comprises non-transitory memory, initiating data reconstruction as the remedial action for any data stored on the non-transitory memory; and when the resource comprises a computer processor, migrating or restarting a job previously executing on a failed computer processor to an operational computer processor.

21. The method of claim 20, further comprising determining the resource failure as correlated to other resource failures, when a statistically significant number of resources having failures reside in a same system domain.

* * * * *